United States Patent
Gopalan et al.

(10) Patent No.: US 9,712,998 B2
(45) Date of Patent: *Jul. 18, 2017

(54) CREATION AND MANAGEMENT OF RFID DEVICE VERSIONS

(71) Applicant: Microsoft Technology Licensing, LLC, Redmond, WA (US)

(72) Inventors: Krishnan Gopalan, Bellevue, WA (US); Kalyan Chakravarthy Sonnathi, Hyderabad (IN); Bhuvanesh N. Jain, Tamil Nadu (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,080

(22) Filed: Nov. 11, 2016

(65) Prior Publication Data

US 2017/0064542 A1 Mar. 2, 2017

Related U.S. Application Data

(63) Continuation of application No. 15/089,887, filed on Apr. 4, 2016, now Pat. No. 9,538,367, which is a (Continued)

(51) Int. Cl.
*H04Q 5/22* (2006.01)
*G05B 11/01* (2006.01)
(Continued)

(52) U.S. Cl.
CPC .......... *H04W 8/22* (2013.01); *G06K 7/10198* (2013.01); *H04W 4/008* (2013.01)

(58) Field of Classification Search
CPC ....................................................... H04W 8/22
See application file for complete search history.

(56) References Cited

U.S. PATENT DOCUMENTS 5,991,826 A * 11/1999 McGee ................. G06F 9/4411
710/10
7,071,825 B2 7/2006 Voba
(Continued)

OTHER PUBLICATIONS

"New Version of BizTalk Includes Upgraded EDI and RFID Support", Retrieved from: <<http://www.mbtmag.com/current_issues/2006/july/compinfra5.asp>>, Retrieved on: May 22, 2007, 2 Pages.
(Continued)

*Primary Examiner* — Joseph Feild
*Assistant Examiner* — Pameshanand Mahase
(74) *Attorney, Agent, or Firm* — Harness, Dickey & Pierce, P.L.C.

(57) ABSTRACT

The claimed subject matter provides a system and/or method that creates, manages, or maintains multiple device versions in a network of Radio Frequency Identification (RFID) devices. The system can include components that detect whether a device has joined the network and based at least in part on such indication creates a device profile the first time that the device is detected, establishes a version trail containing configuration settings specific to the detected device, and thereafter builds and maintains the version trail when the device joins and/or leaves the network.

20 Claims, 8 Drawing Sheets

Related U.S. Application Data continuation of application No. 14/861,115, filed on Sep. 22, 2015, now Pat. No. 9,330,288, which is a continuation of application No. 11/845,532, filed on Aug. 27, 2007, now Pat. No. 9,179,292.

(51) Int. Cl.
  *G08B 13/14* (2006.01)
  *H04L 17/02* (2006.01)
  *G06F 19/00* (2011.01)
  *G06F 7/00* (2006.01)
  *H04W 8/22* (2009.01)
  *G06K 7/10* (2006.01)
  *H04W 4/00* (2009.01)

(56) References Cited

U.S. PATENT DOCUMENTS

| | | | |
|---|---|---|---|
| 7,123,151 B2 | 10/2006 | Garber et al. | |
| 7,570,166 B2 | 8/2009 | Alden et al. | |
| 2003/0054767 A1* | 3/2003 | Mandhyan | H04M 1/725 455/41.1 |
| 2003/0083811 A1 | 5/2003 | Demir et al. | |
| 2003/0227392 A1 | 12/2003 | Ebert et al. | |
| 2005/0092825 A1 | 5/2005 | Cox et al. | |
| 2005/0101314 A1 | 5/2005 | Levi | |
| 2005/0250522 A1* | 11/2005 | Gilbert | H04M 1/274516 455/466 |
| 2005/0253718 A1 | 11/2005 | Droms et al. | |
| 2006/0022800 A1 | 2/2006 | Krishna et al. | |
| 2006/0033606 A1 | 2/2006 | Howarth et al. | |
| 2006/0145854 A1 | 7/2006 | Garber et al. | |
| 2006/0161878 A1 | 7/2006 | Koh et al. | |
| 2006/0284727 A1 | 12/2006 | Steinke | |
| 2007/0044095 A1 | 2/2007 | Banerjee | |
| 2007/0046467 A1 | 3/2007 | Chakraborty et al. | |
| 2007/0139163 A1 | 6/2007 | Powell et al. | |
| 2007/0229264 A1 | 10/2007 | Eveland | |
| 2008/0266095 A1 | 10/2008 | Hanebeck | |
| 2008/0290995 A1 | 11/2008 | Bruns et al. | |

OTHER PUBLICATIONS

"RFID Middleware Products: WebOTX", Retrieved from <<http://www.nec.com/en/global/prod/webotx/en/rfid.html, Retrieved on: Sep. 17, 2015, 4 Pages.

"WebOTX RFID Manager Introduction", Retrieved from <<http://www.nec.com/en/global/prod/webotx/en/pdf/WebOTX_RFID_presentation_nec_en.pdf>>, Jun. 10, 2010, 21 Pages.

"Final Office Action Issued in U.S. Appl. No. 11/845,532", Mailed Date: Nov. 14, 2011, 11 Pages.

"Final Office Action Issued in U.S. Appl. No. 11/845,532", Mailed Date: Feb. 13, 2014, 13 Pages.

"Final Office Action Issued in U.S. Appl. No. 11/845,532", Mailed Date: Mar. 3, 2015, 19 Pages.

"Non-Final Office Action Issued in U.S. Appl. No. 11/845,532", Mailed Date: Jul. 23, 2014, 16 Pages.

"Non-Final Office Action Issued in U.S. Appl. No. 11/845,532", Mailed Date: Aug. 9, 2012, 11 Pages.

"Non-Final Office Action Issued in U.S. Appl. No. 11/845,532", Mailed Date: Jul. 18, 2013, 10 Pages.

"Non-Final Office Action Issued in U.S. Appl. No. 11/845,532", Mailed Date: May 12, 2011, 10 Pages.

"Notice of Allowance Issued in U.S. Appl. No. 11/845,532", Mailed Date: Jul. 8, 2015, 7 Pages.

"Notice of Appeal Filed in U.S Appl. No. 11/845,532", Filed Date: Jun. 3, 2015, 2 Pages.

"Pre-Brief Appeal Panel Conference Decision Issued in U.S. Appl. No. 11/845,532", Mailed Date: Jul. 21, 2015, 2 Pages.

"Pre-Appeal Brief Request for Review Issued in U.S. Appl. No. 11/845,532", Mailed Date: Jun. 3, 2015, 7 Pages.

"Response to Final Office Action Filed in U.S. Appl. No. 11/845,532", Filed Date: May 8, 2014, 15 Pages.

"Response to Final Office Action Filed in U.S. Appl. No. 11/845,532", Filed Date: Feb. 12, 2012, 14 Pages.

"Response to Non-Final Office Action Filed in U.S. Appl. No. 11/845,532", Filed Date: Nov. 5, 2012, 14 Pages.

"Response to Non-Final Office Action Filed in U.S. Appl. No. 11/845,532", Filed Date: Oct. 18, 2013, 14 Pages.

"Response to Non-Final Office Action Filed in U.S. Appl. No. 11/845,532", Filed Date: Aug. 12, 2011, 10 Pages.

"Response to Non-Final Office Action Filed in U.S. Appl. No. 11/845,532", Filed Date: Oct. 23, 2014, 16 Pages.

"Notice of Allowance Issued in U.S. Appl. No. 14/861,115", Mailed Date: Jan. 8, 2016, 10 Pages.

"Amendment Filed in U.S. Appl. No. 15/089,887", Filed Date: Sep. 8, 2016, 6 Pages.

"Amendment Filed in U.S. Appl. No. 15/089,887", Mailed Date: Sep. 15, 2016, 6 Pages.

"Amendment Filed in U.S. Appl. No. 15/089,887", filed Oct. 18, 2016, 3 Pages.

"Notice of Allowance Issued in U.S. Appl. No. 15/089,887", Mailed Date: Aug. 30, 2016, 14 Pages.

Chen, et al., "A Model-Driven Approach to RFID Application Programming and Infrastructure Management", In Proceedings of the IEEE International Conference on e-Business Engineering, Oct. 12, 2005, pp. 256-259.

Diekmann, et al., "Data-on-Network vs. Data-on-Tag: Managing Data in Complex RFID Environments", In Proceedings of the 40th Annual Hawaii International Conference on System Sciences, Jan. 3, 2007, 10 Pages.

Potdar, et al., "Tamper Detection in RFID Tags", In Proceedings of the Lecture Notes in Computer Science, Retrieved on: May 22, 2007, 10 Pages.

* cited by examiner

CREATION AND MANAGEMENT OF RFID DEVICE VERSIONS

CROSS-REFERENCE TO RELATED APPLICATIONS

This application claims priority to and is a continuation of co-pending U.S. patent application Ser. No. 15/089,887 entitled "Creation and Management of Device Versions" and filed Apr. 4, 2016 which is a continuation of U.S. patent application Ser. No. 14/861,115 entitled "Creation and Management of RFID Device Versions" and filed Sep. 22, 2015 which is a continuation of U.S. patent application Ser. No. 11/845,532 entitled "Creation and Management of RFID Device Versions" and filed Aug. 27, 2007, which are incorporated herein by reference.

BACKGROUND

Many retail, manufacture, and distribution establishments are applying different and innovative methods to increase efficiency. These establishments can monitor store inventory to facilitate optimizing supply and demand relating to customers. One aspect of maximizing profit margins hinges on properly stocking inventory such that replenishment occurs in conjunction with exhaustion of goods and/or products. For instance, a retailer selling computers and/or consumer electronic components, such as VCRs, DVDs, and the like, typically must stock such retail items in relation to its customer sales. Thus, if computers are subject to higher demand than other consumer electronic components, then the retailer will need to replenish stock in computers more frequently than other consumer electronic items in order to optimize supply and demand, and in turn, profit. Monitoring inventory and associated sales can typically be a daunting and complex task, wherein product activity is comparable to a black box since inner workings can be unfathomable and unknown; yet monitoring products can be a crucial element in inventory/product efficiency.

Automatic identification and data capture (AIDC) technologies, and specifically, Radio Frequency Identification (RFID) has been developed based at least in part on the perceived need to cure deficiencies of typical monitoring systems and/or methodologies (e.g., barcode readers, barcodes, and/or Universal Product Codes (UPCs). Radio Frequency Identification (RFID) can be a technique that effectuates and facilitates remotely storing and/or retrieving data through utilization of Radio Frequency Identification (RFID) tags. Since Radio Frequency Identification (RFID) systems are generally based on radio frequency and associated signals, numerous benefits and/or advantages over traditional techniques in monitoring products can be evident. Radio Frequency Identification (RFID) technologies generally do not require a line of sight in order to monitor products and/or receive signals from confederated Radio Frequency Identification (RFID) tags. Consequently, no manual scan is necessary wherein a scanner is required to be in close proximity of the target (e.g., product, item of interest, etc.). Nevertheless, range can be limited in Radio Frequency Identification (RFID) based on radio frequency employed, Radio Frequency Identification (RFID) tag size, and associated power source. Further, Radio Frequency Identification (RFID) systems can allow multiple reads within seconds providing quick scans and identifications. Radio Frequency Identification (RFID) systems thus allows a plurality of tags to be read and/or identified when Radio Frequency Identification (RFID) tags are with a range of an Radio Frequency Identification (RFID) device or reader. The capability of multiple reads in an Radio Frequency Identification (RFID) system can be complimented with the ability to provide informational tags that can contain unique identification codes to each individual product.

Furthermore, Radio Frequency Identification (RFID) systems and/or modalities can provide real-time data associated with Radio Frequency Identification (RFID) tagged items. Real-time data streams allow retailers, distributors, and/or manufacturers the ability to monitor inventory and/or products with exactitude and precision. Employing Radio Frequency Identification (RFID) can further effectuate and facilitate the supply of products in both front-end distributions (e.g., retailers to customers) and back-end distributions (e.g., distributors/manufacturers to retailers). Distributors/manufacturers can scrutinize and monitor shipments of goods, quality, quantity, shipping and transit times, etc. In addition, retailers can track quantities of inventory received, location of such inventory, quality, shelf-life, etc. The aforementioned benefits demonstrate a few instances of the versatility and flexibility of Radio Frequency Identification (RFID) technologies to function across multiple domains, such as, front-end supply, back-end supply, distribution chains, manufacturing, retail, automation, etc.

A Radio Frequency Identification (RFID) system can consist of Radio Frequency Identification (RFID) tags and Radio Frequency Identification (RFID) transceivers. Radio Frequency Identification (RFID) tags can contain an antenna that provides reception and/or transmission of radio frequency queries from Radio Frequency Identification (RFID) transceivers. Radio Frequency Identification (RFID) tags can typically be a small object, such as, for instance, adhesive stickers, flexible labels, integrated chips, and the like. Typically there are four frequencies Radio Frequency Identification (RFID) tags can utilize: low frequency (e.g., between about 125 to 134 kilohertz (KHz)), high frequency (about 13.56 megahertz (MHz)), Ultra High Frequency (UHF) (about 868 to 956 megahertz (MHz)) and Microwave (about 2.45 gigahertz (GHz)).

In general, Radio Frequency Identification (RFID) systems can include multiple components: tags, tag readers (e.g., tag transceivers), tag writers, tag programming stations, circulation readers, sorting equipment, tag inventory wands, and the like. Further, various makes, models, and/or types can be associated with respective components (e.g., tags, devices, Radio Frequency Identification (RFID) devices, tag readers, tag programming stations, circulation readers, . . . ). Each component and/or device can over the life time of the device require routine software updates, temporary and/or permanent re-configuration, and/or manipulation in order to function properly within a dynamic and constantly changing working environment. Thus, given the large number of interdependent configuration settings that deal with Radio Frequency Identification (RFID) devices, and more particularly, with the Radio Frequency (RF) aspects (e.g., network settings, antenna configuration, etc.) associated with such devices, and the complexity involved in configuring and managing such devices, enterprise administrators require systems and methods to manage and monitor such change in a comprehensive and rational manner.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The subject matter as claimed relates to systems and methods that facilitate and effectuate creation and management of Radio Frequency Identification (RFID) device versions in a comprehensible, auditable, and simple manner. More particularly, the claimed subject matter provides a thorough audit trail and history of changes that occur to individual Radio Frequency Identification (RFID) devices (and individual components thereof) incorporated or included in a network of Radio Frequency Identification (RFID) enable devices and non-Radio Frequency Identification (RFID) enabled-devices.

The claimed subject matter in accordance with one aspect can provide device version schemas, check pointing of device versions at detection or connect time, display (graphical and/or textual) of differences between versions of a particular device, and application of prior device versions (or saved device versions) to a device.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
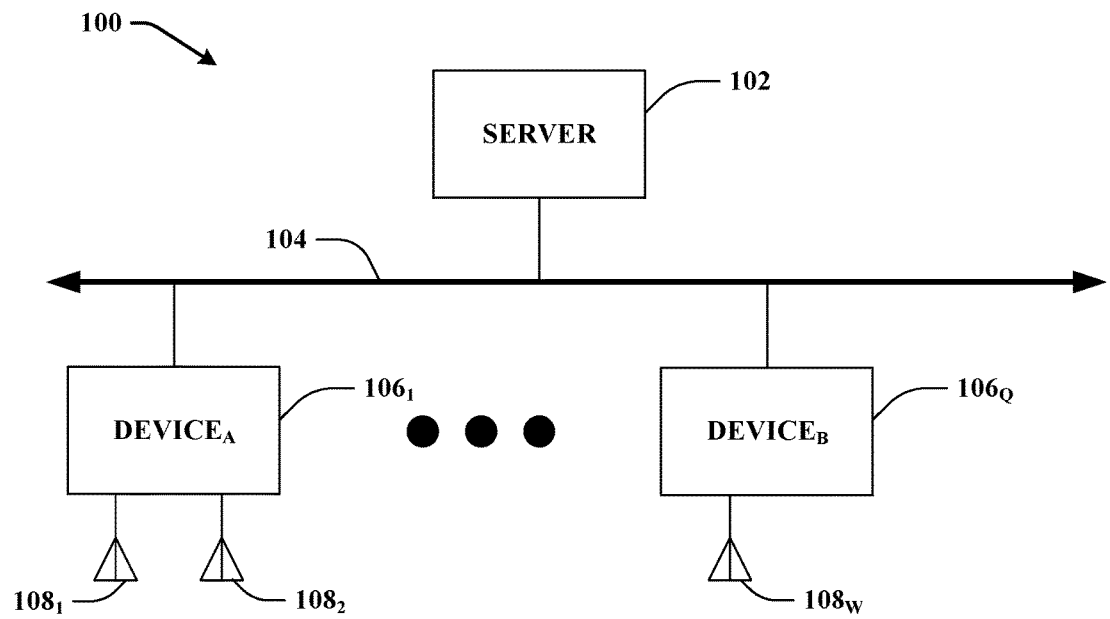
FIG. 1 illustrates a machine-implemented system that creates, manages, and/or maintains Radio Frequency Identification (RFID) device versions in a radio frequency identification network in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Radio Frequency Identification (RFID) devices are typically extremely complex to maintain and manage. For instance, a typical Radio Frequency Identification (RFID) device can consist of many hundreds, if not thousands, of interdependent configuration settings that can deal with Radio Frequency (RF) parameters, network settings, and/or antenna configuration aspects of the device. Consequently, an enterprise administrator, during the course of administering Radio Frequency Identification (RFID) devices, can make many multiple changes to the configuration of a particular Radio Frequency Identification (RFID) device. For example, during the course of time (e.g., during the course of a week) an administrator can configure and re-configure, as the need arises, a particular Radio Frequency Identification (RFID) transceiver device (e.g., a Radio Frequency Identification (RFID) tag reader) for use at a North Receiving Dock Door on Monday, a South Dispatching Dock Door on Wednesday, as a field enabled device on Thursday morning, and back to a North Receiving Dock Door on Friday afternoon. In order to facilitate and effectuate such fluidity the claimed subject matter can, for example, employ a versioning schema, check point a device at connect or detect time, display graphically and/or textually differences between device versions, and apply saved or persisted device versions (or selected properties thereof) to identified devices.

FIG. 1 depicts an illustrative system 100 that creates, manages and/or maintains Radio Frequency Identification (RFID) device versions in a radio frequency identification network in accordance with an aspect of the claimed subject matter. System 100 can comprise server 102 that can include the functionality of database management services. Such database functionality as employed by server 102 can include utilization of modeling languages to define schema based on one or more database management organizational (e.g., hierarchical, network, relational and/or object, etc.) model, data structures (e.g., fields, records, files, and/or objects) optimized to deal with large amounts of data persisted on storage devices (both local and remote), and/or query languages and report writers that permit users and administrators to interactively interrogate the database, analyze the data contained therein, and create, modify, and/or update data according to pre-set or dynamically or contemporaneously determined privileges. Additionally, database functionality utilized by server 102 can include transaction mechanisms that can typically guarantee ACID (Atomicity, Consistency, Isolation, Durability) properties in order to ensure data integrity in the face of concurrent user access (e.g., concurrency control) and the periodic emergence of faults or errors (e.g., fault tolerance).

Additionally and/or alternatively, server 102 can be implemented entirely in software, hardware, and/or a combination of software and/or hardware. Further, server 102 can be incorporated within and/or associated with other compatible components, such as for instance, devices and/or appliances that can include processors (e.g., desktop computers, laptop computers, notebook computers, cell phones, smart phones, Personal Digital Assistants (PDAs), multimedia Internet enabled mobile phones, multimedia players, and the like). As depicted, server 102 can be in continuous and operative, or sporadic and intermittent communication via network topology 104 with device$_A$ 106$_1$-device$_B$ 106$_Q$ (hereinafter collectively referred to as "devices 106"), where A, B, and Q denote integers greater than or equal to zero (0).

Network topology 104 can include any viable communication and/or broadcast technology, for example, wired and/or wireless modalities and/or technologies can be utilized to effectuate the claimed subject matter. Moreover, network topology 104 can include utilization of Personal Area Networks (PANs), Local Area Networks (LANs), Campus Area Networks (CAMs), Metropolitan Area Networks (MANs), extranets, intranets, the Internet, Wide Area Networks (WANs)—both centralized and distributed—and/or any combination, permutation, and/or aggregation thereof.

Devices 106 can be any type of machine that includes a processor and capable of effective communication with network topology 104. Machines and/or services that can comprise devices 106 can include desktop computers, server class computing devices, cell phones, smart phones, laptop computers, notebook computers, Tablet PCs, consumer and/or industrial devices and/or appliances, hand-held appliances and/or devices, Personal Digital Assistants (PDAs), multimedia Internet mobile phones, printers, readers, transmitters, sensors, real-time devices and/or sensors, devices extensible to a web service, real-time event generation systems, and the like. Additionally, devices 106 can include Radio Frequency Identification (RFID) specific devices, such as readers, sensors, writers, printers, tag programming stations, circulation readers, sorting equipment, tag inventory wands, etc. As will be appreciated by those conversant in the art, devices 106 can include any combination and/or permutation of the foregoing devices 106 without prejudice, limitation, or disclaimer. Additionally, as will be further appreciated by those cognizant of the art, network topology 104 can include any and all combinations and/or permutation of the foregoing devices 106 with departing from the spirit, intent, and/or ambit of the claimed subject matter.

In addition, devices 106 can include antennae 108$_1$, 108$_2$, . . . , 108$_W$, where W represents a positive integer, whole number, or natural number greater than or equal zero (0). Unless otherwise indicated, antennae 108$_1$, 108$_2$, . . . , 108$_W$, hereinafter can collectively be referred to as "antenna 108". As illustrated in FIG. 1, device$_A$ 106$_1$ has two antennae 108$_1$ and 108$_2$ associated therewith whereas device$_B$ can have confederated a single antenna 108$_W$. Antennae 108$_1$, 108$_2$, . . . , 108$_W$ can include utilization of balanced and/or unbalanced antenna technologies. Moreover, devices 106 can be associated with, and can have control over, more than one antenna 108

Figure 2:
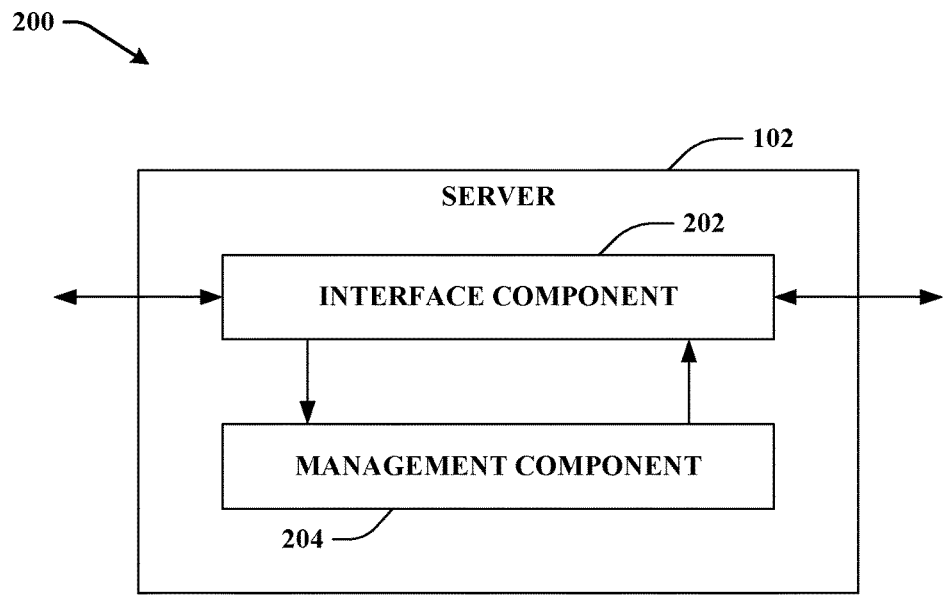
FIG. 2 depicts machine-implemented system that creates, manages, and/or maintains Radio Frequency Identification (RFID) device versions in a radio frequency identification network in accordance with one aspect of the claimed subject matter.

FIG. 2 provides a more detailed depiction 200 of server 102 that creates, manages and/or maintains Radio Frequency Identification (RFID) device versions in accordance with an illustrative aspect of the claimed subject matter. Server 102 as depicted can include interface component 202 (hereinafter referred to as "interface 202") that can be in continuous and/or intermittent communication with devices 106 via network topology 104. Additionally, server 102 can also include management component 204 that can, for instance, continuously and/or sporadically poll, interrogate, examine and/or enumerate the quantity, type, and configuration parameters of devices 106 extant on, or that can form, network topology 104, as well as detect and configure devices newly added (e.g., devices for which server 102 has no prior record) to network topology 104. Management component 204 can thereafter persist such received, elicited, obtained, and/or derived information to local and/or remotely situated primary and/or secondary storage media as versions or time synchronized instances of current configuration parameters or settings of devices 106 at any instant in time. Such versioning information can be employed to configure, customize, and/or reset currently non-functioning or dysfunction devices 106 (e.g., Radio Frequency Identification (RFID) devices) to settings that can have been optimal in the past. Additionally and/or alternatively versioning data contemporaneously and/or previously developed, established, or deduced by management component 204 can be utilized to configure or re-configure ostensibly functional devices 106 to other forms of device. For instance, a fully functioning portable Radio Frequency Identification (RFID) wand tag reader employed in an enterprise factory environment can be temporarily configured for use in the field (e.g., at a sub-contractors work-shop) and thereafter can be reconfigured back to those configuration settings that existed immediately prior to its excursion into the field.

Interface 202 can receive data from a multitude of sources, such as, for example, those associated with a particular individual Radio Frequency Identification (RFID) device (or components parts of the Radio Frequency Identification (RFID) device), client applications, services, users, clients, and/or entities involved with a particular transaction, a portion of transaction, and thereafter convey the received information to management component 204 for further analysis and/or evaluation. Additionally, interface 202 can receive data from management component 204 which then can be utilized to present (e.g., through a graphical or textual display modality) configuration alternatives based on persisted, or contemporaneously derived, versioning information associated with devices 106, or device classifications (e.g., certain select configuration parameters employed by Radio Frequency Identification (RFID) tag readers can be similar or common to all such tag readers).

Interface 202 can provide various adapters, connectors, channels, communication pathways, etc. to integrate the various components included in system 200 into virtually any operating system and/or database system and/or with one another. Additionally, interface 202 can provide various adapters, connectors, channels, communication modalities, etc. that provide for interaction with various components that can comprise system 200, and/or any other component (external and/or internal), data and the like associated with system 200.

Management component 204 can keep track of all changes that occur to particular devices 106 (and component parts thereof) over time and can further aggregate changes that ensue in the interim between set points or check points (e.g., two or more instance in time) as versions. Accordingly, whenever a Radio Frequency Identification (RFID) device configuration changes management component 204 can capture the changes and persist the change as part of a device setting associated with a particular Radio Frequency Identification (RFID) device or class of Radio Frequency Identification (RFID) device. Such functionality allows management component 204 and/or an administrator (e.g., situated in Cape Coral, Fla.) of an enterprise system (e.g., located in Iqaluit, Nunavut, Canada) to ascertain when a particular device, class of devices, set of disparate devices located in specific locations in the enterprise (e.g., Radio Frequency Identification (RFID) devices at the East Receiving Door of the factory located in Antananarivo, Madagascar), and/or various classes of similar and/or select devices situated and dispersed throughout the extent of the enterprise become non-functional, and to determine the rationale for the discontinuance by employing an audit trail that can be dynamically and/or contemporaneously constructed by management component 204. The audit trail established by management component 204 can include information about what changes were made between set points or check points (e.g., today, yesterday, day before yesterday, etc.), who made the changes, why the changes were made, how the changes were made, and when the changes were made, and further allows administrators to view differences or deltas (e.g., incremental or marginal changes) from a current (e.g., possibly non-functional) parametric arrangement to a previous (e.g., ostensibly functional) device configuration. In this manner management component 204 and/or an administrator employing the subject matter as claimed can obtain information as to device versioning as well as information regarding specific and/or generic device implementation and/or configuration.

Further management component 204 can employ a device version schema that captures device version changes into a database (e.g., Radio Frequency Identification (RFID) Store database). The database based at least in part on the device version schema can thus establish, construct, or utilize device version tables, for example, that can persist the progression of changes that can ensue during the existence of each and every one devices 106 (or component parts thereof) in network topology 104. It should be noted that while the claimed subject matter is exposited in terms of database tables those skilled in the art will appreciate that other salient and suitable structures (e.g., linked lists, binary and/or multi-way trees, hashes, queues, stacks, etc.) can be employed without departing from the spirit, scope, or intent of the subject matter as claimed. Accordingly, when a connection is initially established to devices 106, management component 204 can create, assemble, or construct a property profile that can describe a set of properties that can be configuration settings associated with each of devices 106. The property profile can be stored on local and/or remote persistence devices such as volatile memory or non-volatile memory, or both volatile and non-volatile memory. For example, if a Radio Frequency Identification (RFID) reader is introduced to network topology 104, management component 204 via interface 202 can cause the newly added device to divulge, or alternatively and/or additionally, obtain or construct/build a property profile for the added device. Once a property profile has been constructed, built, or elicited it can be stored in the database (e.g., Radio Frequency Identification (RFID) Store database). It should be noted that the property profile elicited, built, or constructed can be distinct or separate from the device version tables that persist the progression of changes that can ensue during the existence of devices 106 within network topology 104.

As can be appreciated there are many operations that can be undertaken that can produce parametric changes to Radio Frequency Identification (RFID) devices. For instance, adding devices to network topology 104 can create a first version, changing properties (e.g., changing the name, location, or functionality of the device) can create a further version; any agent of change or modification, no matter how trivial, can generate disparate synchronized instances or versions.

Figure 3:
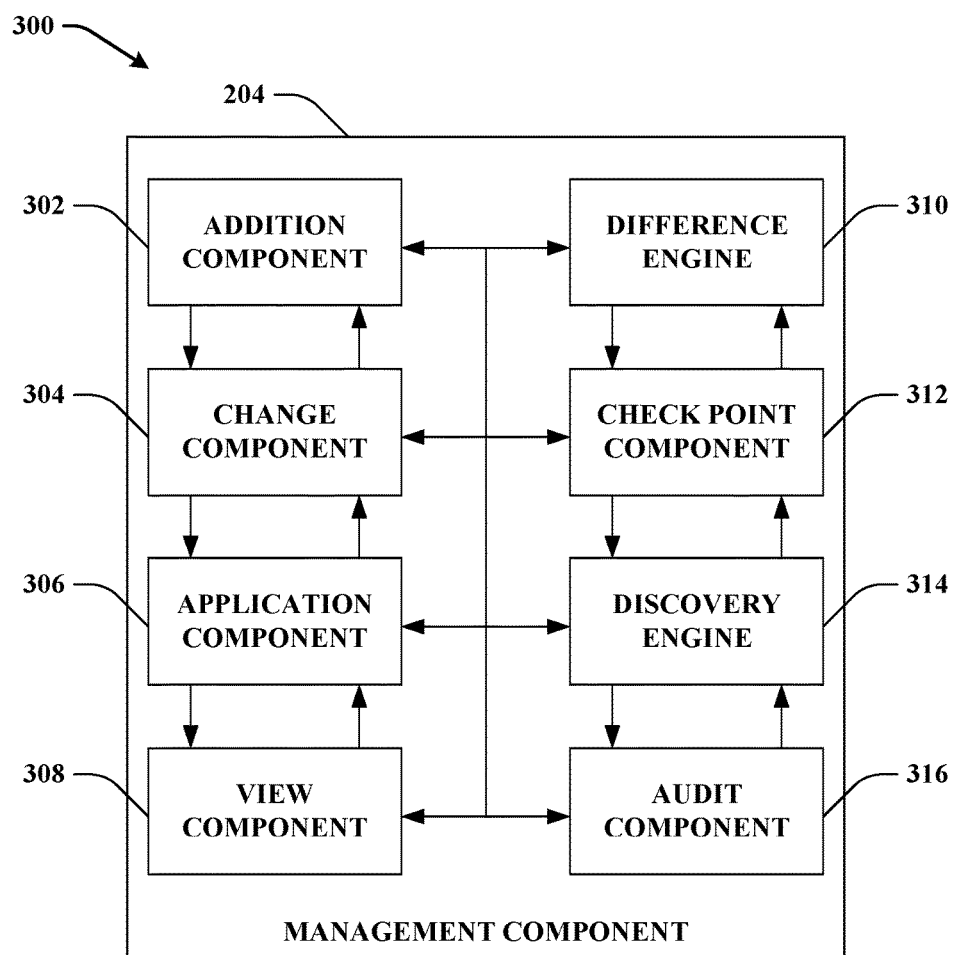
FIG. 3 provides a more detailed depiction of an illustrative management component that creates, manages, and/or maintains Radio Frequency Identification (RFID) device versions in a radio frequency identification network in accordance with an aspect of the claimed subject matter.

Turning now to FIG. 3 depicted therein is a more detailed illustration 300 of management component 204 in accordance with an aspect of the claimed subject matter. As illustrated management component 204 can include addition component 302 that can detect when a connection is initially established with a device, and more particularly, with a Radio Frequency Identification device. Addition component 302 can upon detection of the device probe the device to relinquish or supply pertinent data about itself (e.g., Media Access Control (MAC) address, device type, hardware serial number, etc.). With such information, addition component 302 can create, assemble, or establish a property profile that adequately distinguishes, differentiates, and/or describes a set of properties or configuration settings associated with the detected device. On completion, or during the course of construction, addition component 302 can store the established property profile to storage media associated with server 102, for example. Additionally addition component 302 can cause a database entry to be made in pre-established device version table, or where no device version table has previously been created; addition component 302 can create the device version table and subsequently populate the table with appropriate entries and/or parameters pertaining to detected devices.

Management component 204 can further include change component 304 that can allow management component 204 (or components thereof) or administrators, for example, through textual or graphical interfaces, to effectuate the administration, modification or change of existing device parameters. For example, change component 304 can permit an administrator to change antenna parameters associated with a particular Radio Frequency Identification (RFID) device. As further illustration change component 304 can be employed by management component 204 (or selected components thereof) to modify network settings, or effectuate name changes to associated devices. As will be appreciated each of these change activities can initiate the creation of a new instance or version of the associated device characteristics.

Additionally, management component 204 can include application component 306 that allows management component 204 via interface 202, or alternatively and/or additionally, an administrator employing graphical and/or textual interfaces to modify device settings to prior or previous versions or instances associated with a particular device. Further, application component 306 can customize selected configuration settings associated with a device to prior or previous version instances of that particular device and/or particular device class. For example, application component 306 can based at least in part on device type selectively customize configuration parameters for an entire class of Radio Frequency Identification (RFID) wand tag readers. As a further example application component 306 can discriminately apply device settings on particular and/or selected devices, where each of the device settings emanates from one or more previously established versions associated with the selected devices or from a device class to which the selected device belong.

Management component 204 can also include view component 308 that can be used in conjunction with management component 204, and/or by an enterprise administrator to present device configuration and version information in an easily understandable or comprehensible categorized manner. View component 308 can utilize versioning information (e.g., versions persisted in device version tables, configuration information, and the like) can be extracted, selected, deduced, or derived and thereafter displayed or presented in a familiar easy to use categorized fashion for use by an administrator.

Moreover, management component 204 can include difference engine 310 that can produce and located differences between two more versions. Such a facility can aid in identifying where problems have arisen in the past, and might arise in the future. Administrators can be utilized difference engine 310 to view cumulative and/or iterative differences. For example, difference engine 310 can be employed to find distinctions between version 1 and version X of a particular device. Differences located by difference engine 310 can be display in an textual and/or graphical manner. For instance, differences can be color coded, highlighted, or only fields that are different displayed, in side-by-side comparison between two versions.

Further, management component 204 can include check point component 312 that creates a version based at least in part on the current properties of the device by connecting to the device to retrieve or elicit settings and/or configuration parameters. Such a feature can be useful when a device changed out of the Radio Frequency Identification (RFID) platform (e.g., used for some other functionality not typically related to Radio Frequency Identification (RFID) capabilities). For example, if a device is configured outside the ambit of the claimed subject matter, when the device is introduced into, or re-introduced back into, the Radio Frequency Identification (RFID) network, the device may be rendered non-functional. The check point component 312 allows the claimed subject matter to take into account that settings may have been change externally (not just through the claimed subject matter) and that such setting can be functionally valid externally, though such setting are inoperative in the internal (e.g., the Radio Frequency Identification (RFID)) network. Thus, the check pointing feature provided by check point component 312 obtains or retrieves any changes that may have transpired back to the version table whether or not the detected change led to a functionally but valid, functionally but invalid, non-functionally but valid, or non-functionally but invalid configuration.

Furthermore, management component 204 can additionally include discovery engine 314 that effectuates and facilitate device discovery whenever a device is added or returns to the Radio Frequency Identification (RFID) network. Discovery engine 314 on detection of a device immediately and dynamically captures settings resident on the detected device and persists these settings into a store and thereafter makes these settings available for the administrator if the need arises to commence configuring the detected device appropriately for use with the claimed subject matter. For example, a mobile device can periodically and/or permanently enter and/or exit from the purview of the claimed subject matter. During the transition period—a user of the mobile device can have configured the settings on the device—so when the device returns back to the enterprise and is once again re-introduce into the established Radio Frequency Identification (RFID) network, a discovery or discovery update can be automatically undertaken. It should be noted that as part of the discovery process an administrator can indicate that when a particular device returns to the Radio Frequency Identification (RFID) network that properties associated with the detected and/or returned device should be set to a particular version associated with the device prior to its exit from the established network. Alternative, the administrator can indicate that when a device returns that new or novel setting (e.g., due to a software upgrade or patch release, etc.) or profile.

In addition, management component 204 can also include audit component 316 that provides an auditing trail keyed to each device included in the Radio Frequency Identification (RFID) network. Such an audit trail as maintained by audit component 316 can provide information as to why a change was made, what necessitated the change, how the change was made, who made the change, when the change was made, and which parameters were modified during the change. Such information can be extremely useful in trouble shooting dysfunctional device configurations.

Figure 4:
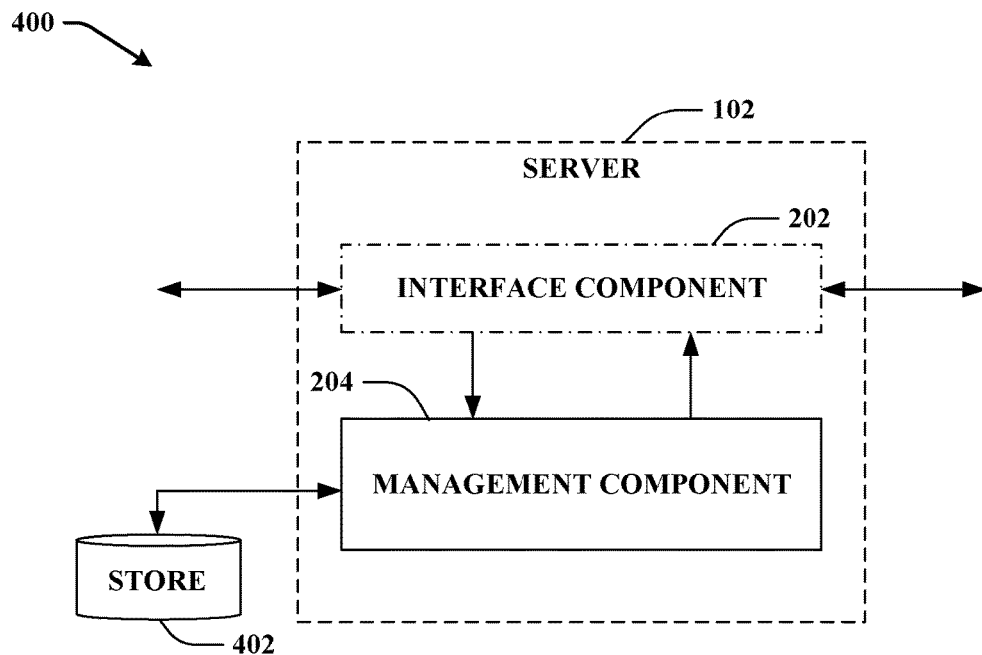
FIG. 4 illustrates a system implemented on a machine that creates, manages, and/or maintains Radio Frequency Identification (RFID) device versions in a radio frequency identification network in accordance with an aspect of the claimed subject matter.

FIG. 4 depicts an aspect of a system 400 that creates, manages and/or maintains Radio Frequency Identification (RFID) device versions in a radio frequency identification network. System 400 can include store 402 that can include any suitable data necessary for management component 204 to facilitate it aims. For instance, store 402 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 402 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 402 of the subject systems and methods is intended to comprise, without being limited to, these and any other suitable types of memory. In addition, it is to be appreciated that store 402 can be a server, a database, a hard drive, and the like.

Figure 5:
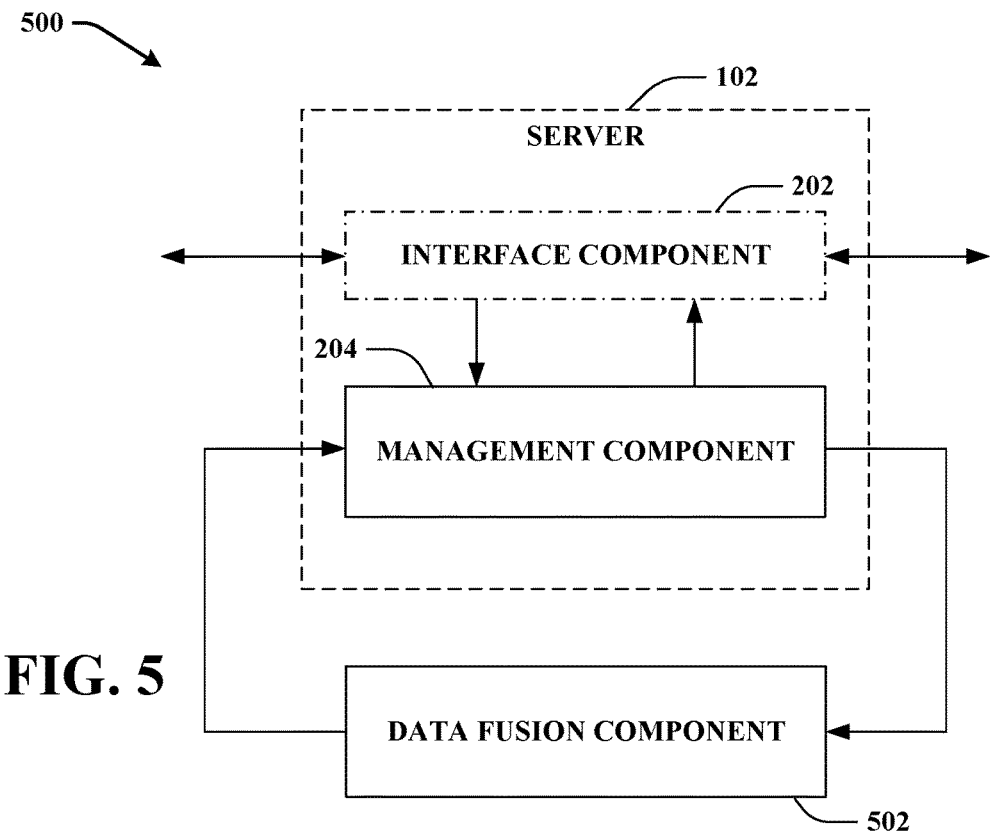
FIG. 5 provides a further depiction of a machine implemented system that creates, manages, and/or maintains Radio Frequency Identification (RFID) device versions in a radio frequency identification network in accordance with an aspect of the subject matter as claimed.

FIG. 5 provides yet a further depiction of a system 500 that creates, manages and/or maintains Radio Frequency Identification (RFID) device versions in a radio frequency identification network in accordance with an aspect of the claimed subject matter. As depicted, system 500 can include a data fusion component 502 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 502 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 6:
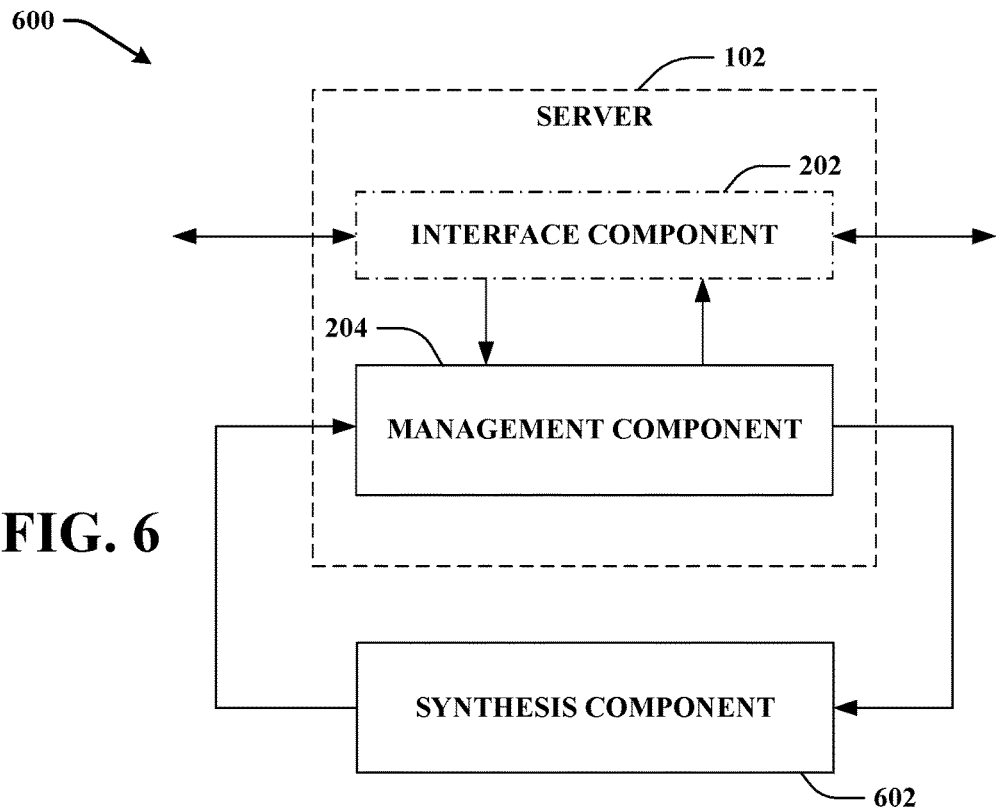
FIG. 6 illustrates yet another aspect of the machine implemented system that creates, manages, and/or maintains Radio Frequency Identification (RFID) device versions in a radio frequency identification network in accordance with an aspect of the claimed subject matter.

FIG. 6 provides a further depiction of a system 600 that creates, manages and/or maintains Radio Frequency Identification (RFID) device versions in a radio frequency identification network in accordance with an aspect of the claimed subject matter. As illustrated management component 204 can, for example, employ synthesizing component 602 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 602 through combining and filtering can provide a set of information that can be more informative, or accurate (e.g., with respect to an entity's communicative or informational goals) and information from just one or two modalities, for example. As discussed in connection with FIG. 5, the data fusion component 502 can be employed to learn correlations between different data types, and the synthesizing component 602 can employ such correlations in connection with combining, or filtering the input data.

Figure 7:
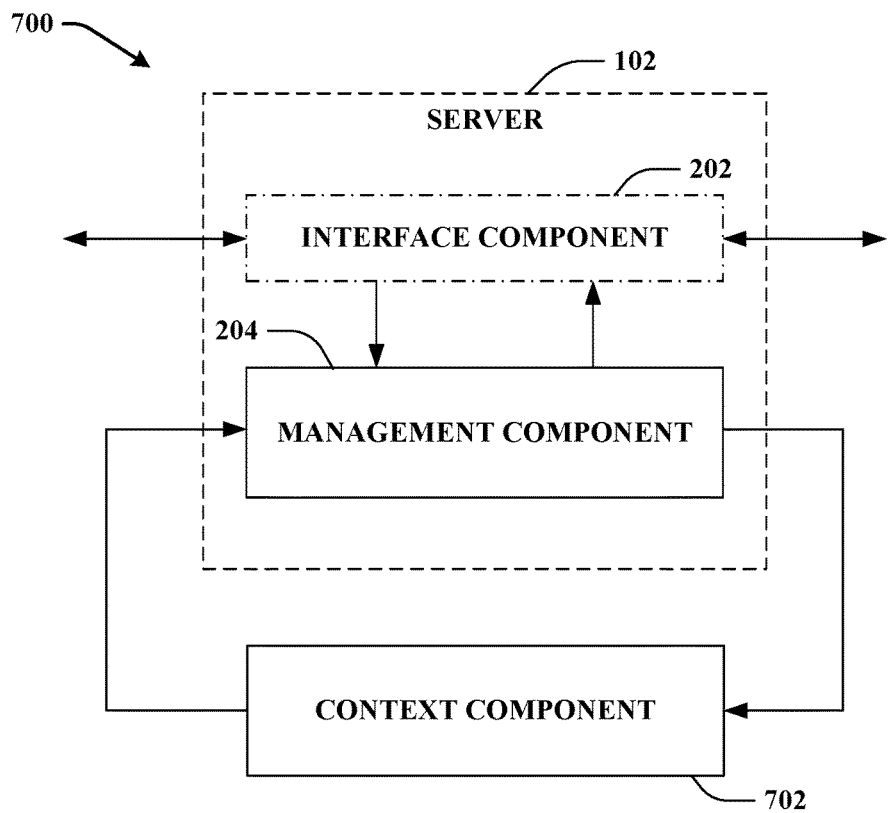
FIG. 7 depicts a further illustrative aspect of the machine implemented system that creates, manages, and/or maintains Radio Frequency Identification (RFID) device versions in a radio frequency identification network in accordance with an aspect of the claimed subject matter.

FIG. 7 provides a further illustration of a system 700 that can creates, manages and/or maintains Radio Frequency Identification (RFID) device versions in a radio frequency identification network in accordance with an aspect of the claimed subject matter. As illustrated management component 204 can, for example, employ context component 702 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 702 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and, and stake). Knowledge that it is near dinnertime of the user as compared to the user campaign would greatly help in recognizing the following spoken words "I need a steak/stake". Thus, if the context component 702 had knowledge that the user was not camping, and that it was near dinnertime, the utterance would be interpreted as "steak". On the other hand, if the context component 702 knew (e.g., via GPS system input) that the user recently arrived at a camping ground within a national park; it might more heavily weight the utterance as "stake".

In view of the foregoing, it is readily apparent that utilization of the context component 702 to consider and analyze extrinsic information can substantially facilitate determining meaning of sets of inputs.

Figure 8:
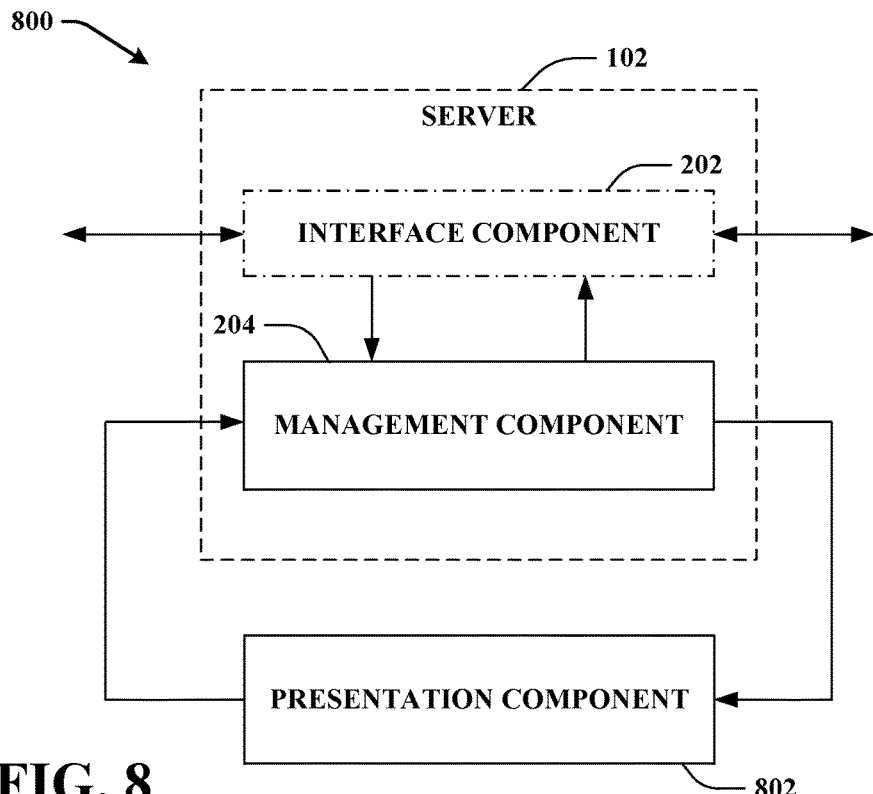
FIG. 8 illustrates another illustrative aspect of a system implemented on a machine that creates, manages, and/or maintains Radio Frequency Identification (RFID) device versions in a radio frequency identification network in accordance of yet another aspect of the claimed subject matter.

FIG. 8 a further illustration of a system 800 that creates, manages and/or maintains Radio Frequency Identification (RFID) device versions in a radio frequency identification network in accordance with an aspect of the claimed subject matter. As illustrated, system 800 can include presentation component 802 that can provide various types of user interface to facilitate interaction between a user and any component coupled to management component 204. As illustrated, presentation component 802 is a separate entity that can be utilized with management component 204. However, it is to be appreciated that presentation component 802 and/or other similar view components can be incorporated into management component 204 and/or a standalone unit. Presentation component 802 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into management component 204.

Users can also interact with regions to select and provide information via various devices such as a mouse, roller ball, keypad, keyboard, and/or voice activation, for example.

Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 9:
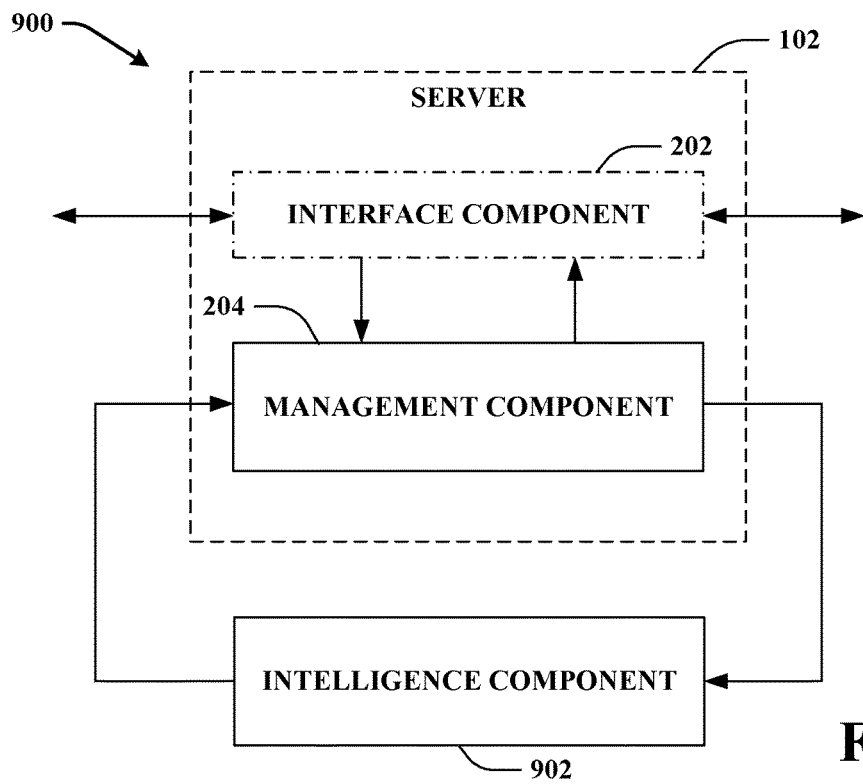
FIG. 9 depicts yet another illustrative aspect of a system that creates, manages, and/or maintains Radio Frequency Identification (RFID) device versions in a radio frequency identification network in accordance with an aspect of the subject matter as claimed.

FIG. 9 depicts a system 900 that employs artificial intelligence to create, manage, and/or maintain Radio Frequency Identification (RFID) device versions in a radio frequency identification network in accordance with an aspect of the subject matter as claimed. Accordingly, as illustrated, system 900 can include an intelligence component 902 that can employ a probabilistic based or statistical based approach, for example, in connection with making determinations or inferences. Inferences can be based in part upon explicit training of classifiers (not shown) before employing system 200, or implicit training based at least in part upon system feedback and/or users previous actions, commands, instructions, and the like during use of the system. Intelligence component 902 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 902 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 10:
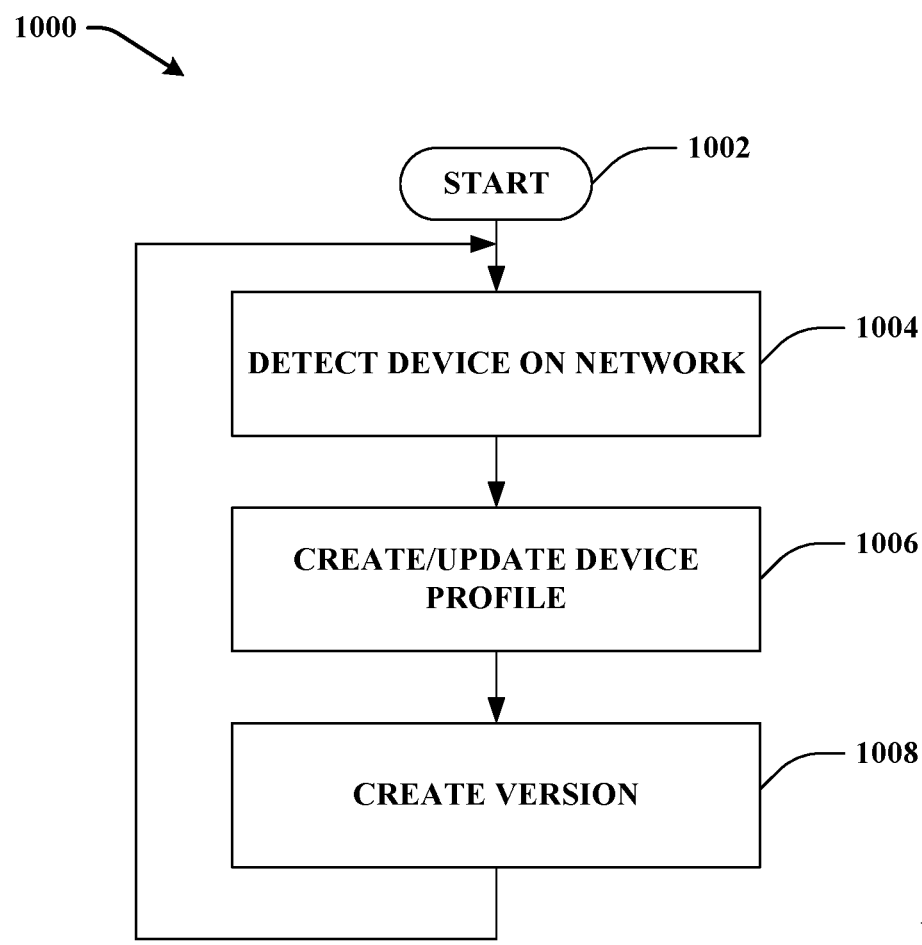
FIG. 10 illustrates a flow diagram of a machine implemented methodology that creates, manages, and/or maintains Radio Frequency Identification (RFID) device versions in a radio frequency identification network in accordance with an aspect of the claimed subject matter.

In view of the exemplary systems shown and described supra, methodologies that may be implemented in accordance with the disclosed subject matter will be better appreciated with reference to the flow chart of FIG. 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 10 provides an illustrative flow diagram illustrating a method 1000 that creates, manages, and/or maintains Radio Frequency Identification (RFID) device versions in a radio frequency identification network in accordance with an aspect of the claimed subject matter. The method commences at 1002 where various and sundry initializations can take place after which the method can proceed to 1004. At 1004 the method can detect the presence, addition, and/or removal of Radio Frequency Identification (RFID) network. Where a device is detected as being added or returning to the network, the method can either create a device profile for the device, or update a previously persisted device profile at 1006. At 1008 the method can perform a check point function with effectively creates a further version instance associated with the detected device. Once a new version has been created at 1008 the method can return to 1004 to detect the presence of further additions and/or removals of devices to the Radio Frequency Identification (RFID) network.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 11:
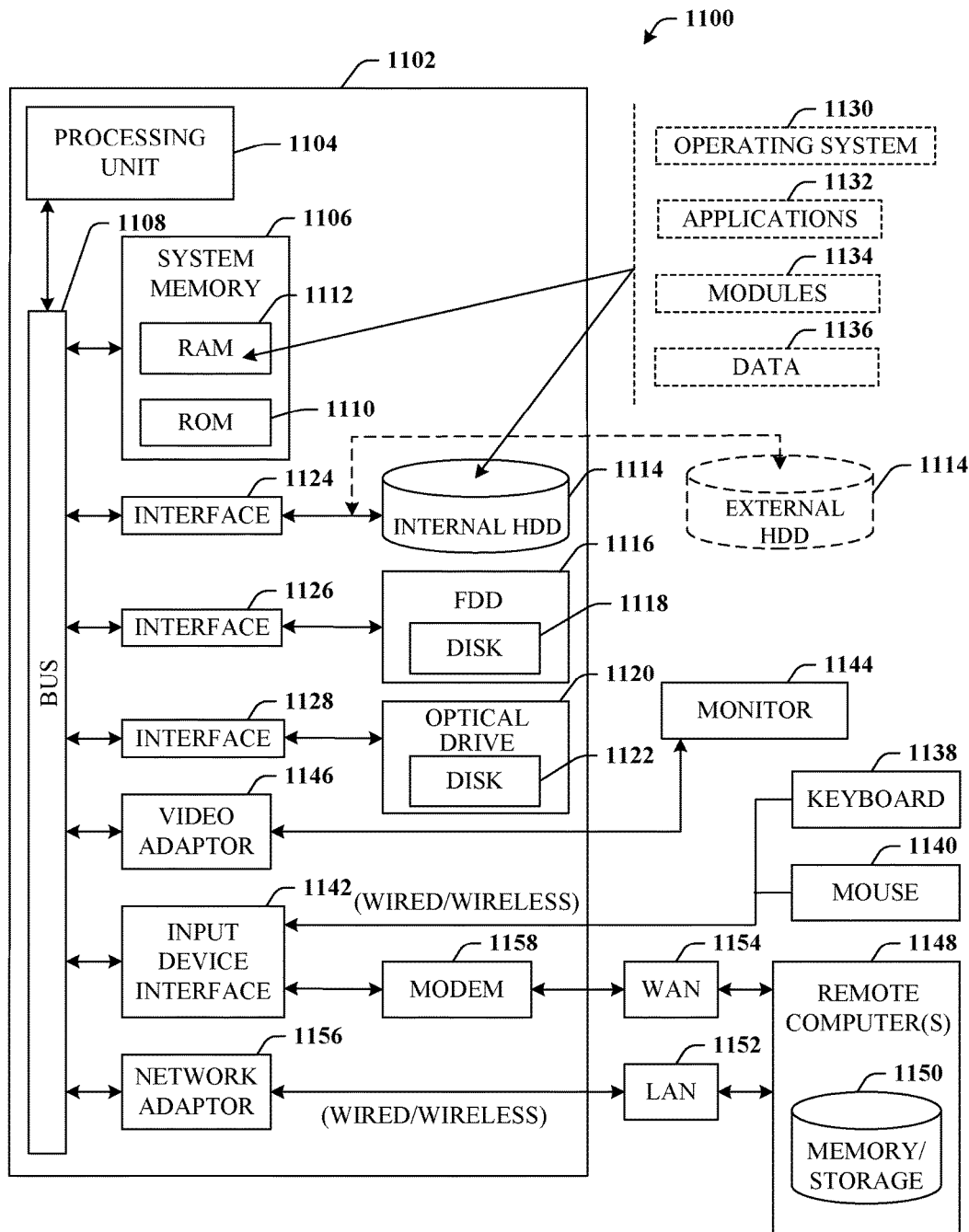
FIG. 11 illustrates a block diagram of a computer operable to execute the disclosed system in accordance with an aspect of the claimed subject matter.

Referring now to FIG. 11, there is illustrated a block diagram of a computer operable to execute the disclosed system. In order to provide additional context for various aspects thereof, FIG. 11 and the following discussion are intended to provide a brief, general description of a suitable computing environment 1100 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1194 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1194 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 12:
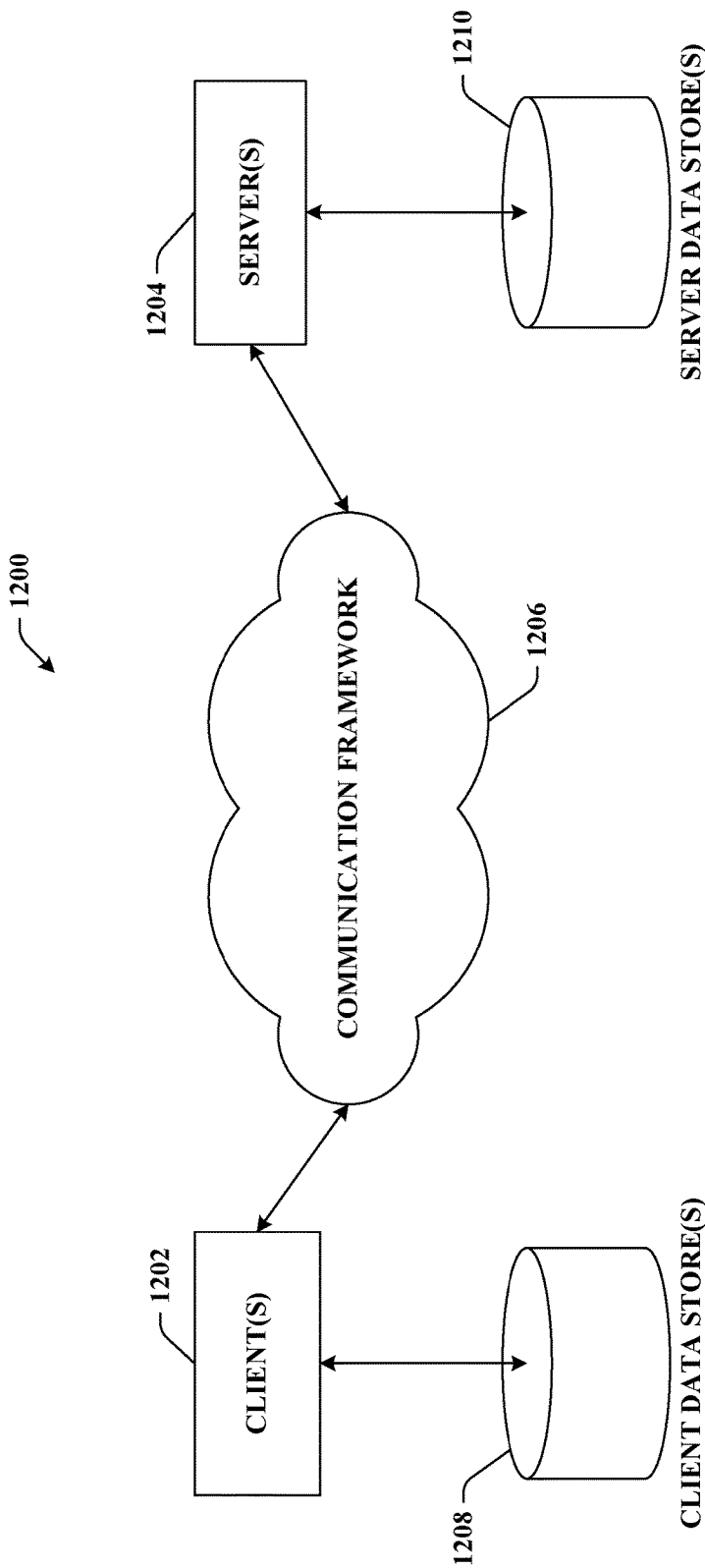
FIG. 12 illustrates a schematic block diagram of an exemplary computing environment for processing the disclosed architecture in accordance with another aspect.

Referring now to FIG. 12, there is illustrated a schematic block diagram of an exemplary computing environment 1200 for processing the disclosed architecture in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device management system, comprising:
    a receiver configured to acquire an indication of a line of sight wireless technology device joining a network, the line of sight wireless technology device configured to communicate with another device using a line of sight wireless technology, the line of sight wireless technology device having an antenna, the line of sight wireless technology device further configured to communicate with the another device using the antenna when within a range of the line of sight wireless technology device;
    an interface configured to interrogate the line of sight wireless technology device via the network to obtain current configuration information associated with the line of sight wireless technology device;
    a server manager configured to create a device profile for the line of sight wireless technology device based on the obtained configuration information; and
    memory configured to store the device profile for the line of sight wireless technology device.

2. The device management system of claim 1, wherein the obtained configuration information comprises interdependent settings.

3. The device management system of claim 2, wherein the obtained configuration information further comprises at least one of parameters, network settings or antenna configuration aspects of the line of sight wireless technology device.

4. The device management system of claim 1, wherein the server manager is further configured to employ the indication as a time-sequence event to establish a check point.

5. The device management system of claim 4, wherein the server manager is further configured to utilize the check point to create a version instance in a version trail, the version instance being configured to provide an aggregation of changes occurring between a previous check point and the check point.

6. The device management system of claim 1, wherein the receiver is further configured to employ an indication of the line of sight wireless technology device leaving the network as a time-sequence event to establish a check point.

7. The device management system of claim 6, wherein the server manager is further configured to utilize the check point to create a version instance in a version trail, the version instance being configured to provide an aggregation of changes occurring between a previous check point and the check point.

8. The device management system of claim 1, wherein the obtained configuration information comprises at least one antenna configuration associated with the line of sight wireless technology device.

9. The device management system of claim 1, wherein the line of sight wireless technology device is further configured to communicate with the another device using a Wi-Fi network.

10. The device management system of claim 1, wherein the line of sight wireless technology device is further configured to communicate with the another device using Bluetooth wireless technology.

11. A device management system, comprising:
a receiver configured to acquire an indication of a line of sight wireless technology device joining a network, the line of sight wireless technology device having an antenna, the line of sight wireless technology device configured to communicate with another device using a line of sight wireless technology, the line of sight wireless technology device further configured to communicate with the another device using the antenna when within a range of the line of sight wireless technology device
a memory configured to store a device profile comprising configuration information for the line of sight wireless technology device;
a server manager configured to obtain the device profile comprising configuration information from the memory; and
an interface configured to provide the obtained configuration information to the line of sight wireless technology device.

12. The device management system of claim 11, wherein the obtained configuration information comprises at least one antenna configuration associated with the line of sight wireless technology device.

13. The device management system of claim 11, wherein the line of sight wireless technology device is further configured to communicate with the another device using a Wi-Fi network.

14. The device management system of claim 11, wherein the line of sight wireless technology device is further configured to communicate with the another device using Bluetooth wireless technology.

15. A device management system, comprising:
memory configured to store a device profile comprising configuration information associated with a line of sight wireless technology device, the line of sight wireless technology device having an antenna, the line of sight wireless technology device configured to communicate with another device using a line of sight wireless technology, the line of sight wireless technology device further configured to communicate with the another device using the antenna when within a range of the line of sight wireless technology device;
a receiver configured to acquire an indication of the line of sight wireless technology device joining a network;
an interface configured to, based at least in part on the indication, interrogate the line of sight wireless technology device to obtain current configuration settings of the line of sight wireless technology device; and
a server manager configured to create another device profile for the line of sight wireless technology device based on the obtained configuration settings of the line of sight wireless technology device,
wherein the memory is further configured to store the another device profile for the line of sight wireless technology device as a second version.

16. The device management system of claim 15, wherein the server manager is further configured to generate differences between the device profile and the another device profile associated with the line of sight wireless technology device.

17. The device management system of claim 15, wherein the obtained configuration information comprises interdependent settings.

18. The device management system of claim 15, wherein the line of sight wireless technology device is further configured to communicate with the another device using a Wi-Fi network.

19. The device management system of claim 15, wherein the line of sight wireless technology device is further configured to communicate with the another device using Bluetooth wireless technology.

20. The device management system of claim 15, wherein the server manager is further configured to employ the indication as a time-sequence event to establish a check point.

* * * * *